MOUNTING ARRANGEMENT FOR TELEVISION RECEIVERS AND THE LIKE

Filed Jan. 22, 1965 2 Sheets-Sheet 1

INVENTOR.
JOSEPH A. LUCASEY
BY
Gardner & Zimmerman
ATTORNEYS

MOUNTING ARRANGEMENT FOR TELEVISION RECEIVERS AND THE LIKE

Filed Jan. 22, 1965 2 Sheets-Sheet 2

INVENTOR.
JOSEPH A. LUCASEY
BY
Gardner & Zimmerman
ATTORNEYS

United States Patent Office 3,291,432
Patented Dec. 13, 1966

3,291,432

MOUNTING ARRANGEMENT FOR TELEVISION RECEIVERS AND THE LIKE

Joseph A. Lucasey, 1917 Clement Ave., Alameda, Calif.

Filed Jan. 22, 1965, Ser. No. 427,286
8 Claims. (Cl. 248—278)

This invention relates to means for mounting television receivers and the like in motel rooms, hotel rooms, etc., and is more particularly directed to a mounting arrangement for this purpose which is designed to discourage, if not prevent, the surreptitious removal of the television receiver or other appliance from its surroundings.

Numerous motels, hotels, and the like have television sets, etc., installed in the rooms thereof for the entertainment of the residents. Typically, the television sets are mounted upon a wall or table by means of brackets secured thereto with bolts, screws, or equivalent fasteners. These fasteners may be readily removed with the aid of ordinary tools such as screwdrivers, pliers, etc. As a result, it is a relatively easy matter to remove the set from its mounting and depart the premises with the set undetected. By virtue of the foregoing, the surreptitious removal and pilfering of television sets from such as motel and hotel rooms has become widespread.

It is therefore an object of the present invention to provide a mounting arrangement for television receivers and the like which is designed to discourage or prevent the unauthorized or surreptitious removal of the receiver from its mounting.

Another object of the invention is the provision of a mounting assembly for television sets and the like arranged for permanent irremovable attachment to a wall, table, etc., and having a support plate for connection to the set by normally inaccessible fasteners which are rendered accessible upon removal of the plate by actuation of a lock mechanism serving to secure the plate in the assembly.

Still another object of the invention is to provide a mounting assembly of the class described which by virtue of the lock mechanism secured support plate facilitates authorized removal of the set for purposes of repair, and the like.

It is yet another object of the invention to provide a mounting assembly of the class described arranged to facilitate the interchangeable mounting of substantially any television set thereon.

A further object of the invention is the provision of a mounting assembly of the class described wherein the support plate is swivelable about orthogonally related axes.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figures 1, 2, 3:
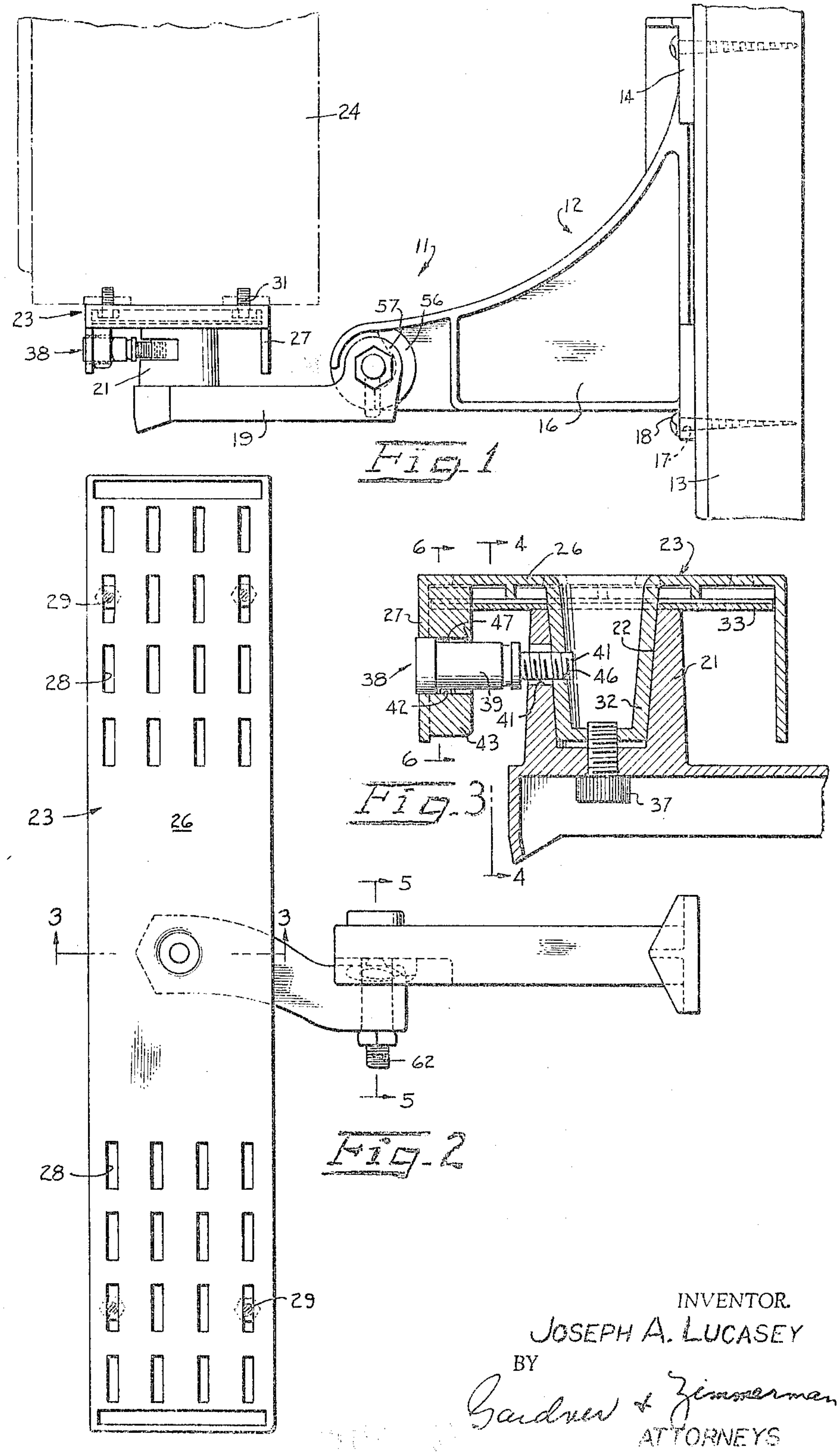
FIGURE 1 is a side elevational view of a mounting assembly in accordance with the invention.
FIGURE 2 is a plan view of the assembly.
FIGURE 3 is a sectional view taken at line 3—3 of FIGURE 2, illustrating particularly details of a support plate locking mechanism of the assembly.
Figure 4:
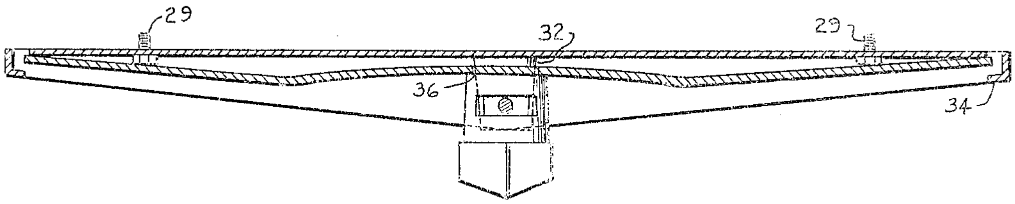
FIGURE 4 is a sectional view of the assembly taken at line 4—4 of FIGURE 3, illustrating particularly the manner in which the fasteners for securing a television set to the support plate of the assembly are rendered inaccessible.

Referring now to the drawings, a mounting assembly 11, in accordance with the present invention will be seen to include a bracket 12, or equivalent mounting means, adapted for attachment to a wall 13 or the like. The bracket preferably comprises a mounting plate 14 having an arm 16 projecting right angularly therefrom, the plate having apertures 17 for the reception of fasteners 18 for securing the bracket to the wall 13. The fasteners 18 are of the one way variety which are arranged to be manipulated by a tool in a direction to screw, or otherwise secure, the fastener in the wall, but cannot be manipulated in the opposite direction. Hence once the bracket is secured to the wall by the fasteners 18, the installation is permanent in that the fasteners cannot be removed to release the bracket.

Secured to the free end of the bracket arm 16, there is preferably provided a pivot arm 19 arranged in a manner subsequently described for pivotal movement about a horizontal axis transverse to the bracket arm between positions inclined relative thereto and a locked position in alignment therewith, or in downwardly inclined relation thereto. The free end of the pivot arm is formed with an upstanding boss 21 having a tapered recess defining a pivot socket 22 for facilitating movement of a support plate 23 about a vertical axis. The support plate is adapted for the attachment of a television set 24, or the like, thereto. More particularly, the support plate is preferably of elongated rectangular cupped configuration including a flat rectangular upper end wall 26 with a marginal side wall 27 depending therefrom. The end wall of the support plate has a plurality of slots 28 formed therein for traversal by bolts 29, or equivalent fasteners, at a plurality of selectable positions to accommodate taps 31, or the like, existing or subsequently formed in the base of the television set. In this regard, the bolts may be inserted through the slots 28 and manipulated within the limits of the slots to positions or registration with the taps 31. The bolts are screwed into the taps to positions wherein the heads of the bolts engage the end wall 26 of the plate on opposite sides of the slots 28 and firmly secure the television set thereto.

As a particularly important feature of the invention, the support plate 23 is arranged in such a manner that unauthorized or surreptitious removal of the set from the plate, and of the plate from the pivot arm 19 is discouraged, if not prevented. Yet authorized removal of the set is permitted in order that same may be repaired or replaced. To these ends the bolts 29 must be normally inaccessible and the support plate secured to the pivot arm in a normally unremovable manner. More particularly, the plate is provided with a centrally depending tapered boss 32 for rotary engagement with the socket 22 of the pivot arm 19. A yieldable normally bowed rectangular cover 33 is adapted to be received within the inner recess of the plate marginally defined by the side wall 27, in covering relation to the heads of the bolts 29, to thereby render the bolts inaccessible. The opposite ends of the side wall are formed with inwardly directed flanges or lips 34 for retentatively engaging the opposite ends of the cover, which may be readily manipulated into position by virtue of its yieldability. The cover is provided with a central aperture 36 for traversal by the boss 32, the boss 21 of the pivot arm 19 engaging the cover about the aperture 36 and urging the normally bowed cover inwardly into engagement with the end wall 26 of the support plate 23, when the boss 32 is fully engaged in the socket 22, as best shown in FIGURE 3. Retention of the boss 32 in engaged position within the socket may be facilitated as by means of a bolt 37 extending through the base of the socket and threadably engaging the boss. It will be appreciated that the support plate could be readily removed from the pivot arm, and the cover withdrawn from the support plate to expose the bolts 29, if the bolt 37 were the only means employed to retain the parts in assembled relation. However, in addition to bolt 37, locking means 38 are provided to normally retain the boss 32 of the support plate in fully engaged position in the socket 22 of the pivot arm, the pivot arm boss 21 at this time retaining the cover in engagement the end wall of the support plate. The locking means 38 may be manipulated by an authorized individual with the aid of a key, for example, to selectively facilitate disassembly of the components.

Considering now the locking means 38 in more detail, same will be seen to include a cylindrical turret 39 having an externally threaded stud 41 projecting from one end thereof. The turret 39 is disposed within a bore 42 extending through an ear 43 depending from the front portion of the support plate side wall 27. The stud 41 in turn traverses a circumferential slot 44 extending through the boss 21 into the socket 22, and threadably engages a tap 46 provided in the boss 32. The stud is movable within the limits of the slot 44 such that limited pivotal movement of the support plate about a vertical axis relative to the pivot arm 19 is permitted. Upon rotation of the turret 39 within the bore 42, the stud 41 may be threadedly engaged with, or disengaged from the tap 46 to thus facilitate assembly or disassembly of the associated components. Unauthorized rotation of the turret 39 is prevented by tumblers 47 which normally project radially from the turret, and which are retractable in the usual manner in response to insertion of a key into a key slot 48 provided in the turret. The tumblers 47 are normally disposed in keyways 49 extending longitudinally of the wall of bore 42 and defined circumferentially between radially inwardly projecting stops 51. Thus when the key is withdrawn from the key slot 48, the tumblers move into radially extended positions within the keyways 49 and are engageable with stops to prevent rotation of the turret. Upon insertion of the key, the tumblers are retracted and the turret may hence be rotated to disengage the stud 41 from the tap 46. Upon removal of bolt 37, the support plate boss 32 may be withdrawn from the pivot arm socket 22, thereby freeing the support plate. The cover 33 may be now removed to expose the bolts 29 for removal from the television set 24. In this manner, authorized removal of the television set for servicing, or the like, is facilitated. Of course, without the key the television set cannot be removed surreptitiously.

Figure 5:
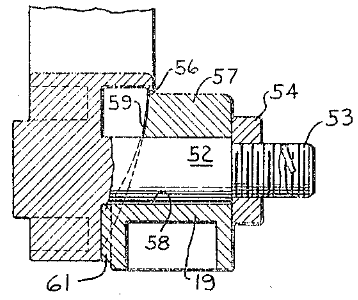
FIGURE 5 is a sectional view taken at line 5—5 of FIGURE 2, illustrating particularly a support plate pivot arrangement of the assembly.
Figure 6:
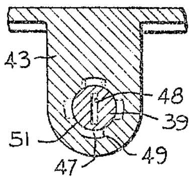
FIGURE 6 is a sectional view taken at line 6—6 of FIGURE 3, illustrating further details of the support plate locking mechanism.

As an important adjunct of the invention, and as previously noted, the swivel connection between the bracket arm 16 and pivot arm 19 is arranged to permit pivotal movement of the swivel arm, and therefore the television set support plate 23 about a horizontal axis between positions inclined relative to the bracket arm and a locked position aligned therewith, or if desired, downwardly inclined therefrom. To this end, the bracket arm 16 is preferably provided with a cylindrical pivot journal 52 projecting laterally from its free end and terminating in an externally threaded outer portion 53 for threaded engagement with a nut 54, as best shown in FIGURE 5. In addition, the bracket arm is formed with a helical cam surface 56 projecting laterally therefrom and extending substantially 180° about journal 52 in concentric outwardly spaced relation thereto on the opposite side thereof from the free end of the bracket arm. The cam surface 56 merges into the side wall of the bracket arm adjacent its lower edge and helically increases to a maximum lateral extent adjacent the upper edge of the arm. The pivot arm 19 is in turn provided with an upstanding ear 57 at the opposite end thereof from boss 21, and such ear has a bore 58 therethrough for concentrically rotatably receiving the journal 52. One side face of the ear 57 is provided with a helical surface 59 substantially complementary to the cam surface 56. Adjacent the lower portion of the surface 59 and extending vertically of the side face of the pivot arm there is provided a protuberance of preferably semi-circular cross section defining a follower 61. With the journal 52 disposed within the bore 58, the surface 59 facing the cam surface 56, and the nut 54 tightened upon threaded portion 53 against the pivot arm 19, it will be appreciated that any tendency of the pivot arm to pivot downwardly from a position aligned with the bracket arm 16 is prevented by the follower 61 moving up the cam surface 56 and engaging same in a tighter and tighter wedge fit. Of course the pivot arm may be pivoted upwardly relative to the bracket arm, the follower being disengaged from the cam surface during such movement. In addition, the pivot arm may be locked in a variety of downwardly inclined positions upon loosening the nut 54 to in turn vary the angular position at which the follower tightly binds with the cam surface. Disassembly of the pivot arm from the bracket arm is prevented by peening, or otherwise deforming the threaded portion 53 adjacent its outer end as indicated at 62.

Figure 7:
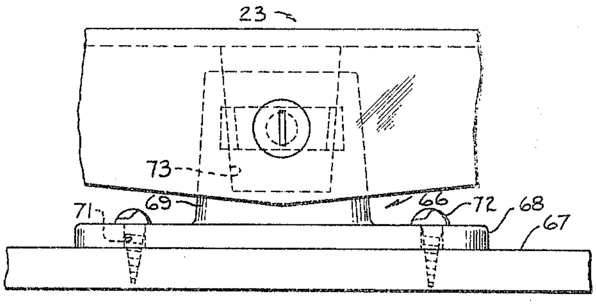
FIGURE 7 is a side elevational view of a modified form of mounting assembly adapted for securance to a table or other horizontal surface.

Although the invention has been described hereinbefore with particular reference to wall bracket mounting means, it will be appreciated that other means may be alternatively employed to facilitate mounting of the television set upon, for example, a horizontal surface such as a table top. In this regard, the mounting assembly may be modified as indicated in FIGURE 7 wherein the bracket 12 and pivot arm 19 are replaced by pedestal mounting means 66 adapted for securance to a table top 67 or other horizontal surface. The mounting means includes a base plate 68 having a cylindrical pedestal or boss 69 projecting vertically upward therefrom. The base plate is formed with apertures 71 through which one way fasteners 72, equivalent to the previously mentioned fasteners 18, extend into securance with the table top 67. The mounting means is thus permanently secured to the table top, since the fasteners 72 cannot be removed. The boss 69 is provided with a tapered socket 73 for receiving the boss 32 of the support plate. The boss 69 is provided with a circumferential slot extending into the socket 73, the boss 69 and socket 73 being thus equivalent to the boss 21 and socket 22 of the previously described embodiment. In further respects the mounting arrangement is identical to that previously described, the stud 41 of turret 39 extending through the slot of boss 69 and engaging the tap 46 of the support plate boss 32 to retain the components in assembled relationship.

What is claimed is:

1. A mounting assembly for television sets and the like comprising mounting means adapted for unremovable attachment to a support surface, a support plate disposed upon said mounting means, fasteners extending through said plate for securance to a television set or the like, a cover disposed adjacent said plate between said plate and said mounting means in covering relation to the engaging portions of said fasteners and retained in engagement with said plate by engagement with said mounting means, and a locking mechanism extending between said support plate and mounting means to secure them together and prevent removal of said cover, said locking mechanism being actuatable by means of a key or the like to permit authorized separation of said support plate and mounting means and removal of said cover plate to expose the engaging portions of said fasteners.

2. A mounting assembly for television sets and the like comprising mounting means adapted for unremovable attachment to a support surface and having a socket therein, a support plate having a depending boss in engagement with said socket and a depending portion spaced from said boss having a bore therethrough, fasteners extending through said plate for securance to a television set or the like and having portions engaging said plate on the side thereof from which said boss depends, a cover having an aperture traversed by said boss and engaging said plate in covering relation to the engaging portions of said fasteners, and a locking mechanism including a turret disposed in said bore and having a threaded portion extending through said mounting means into said socket into threaded engagement with said boss, said locking mechanism having first and second selective conditions of respectively turret rotation preventing engagement with the wall of said bore and free rotation of said turret within said bore.

3. A mounting assembly according to claim 2, further defined by said locking mechanism including tumblers carried by said turret selectively movable between retracted positions in said turret and positions radially extended therefrom, and the wall of said bore having longitudinal keyways circumferentially defined between radially inwardly projecting stops for receiving said tumblers.

4. A mounting assembly for television sets and the like comprising mounting means adapted for unremovable attachment to a support surface and having a boss projecting therefrom, said boss having a socket formed therein, said boss having a circumferential slot extending therethrough, a rectangular cup shaped support plate having a rectangular end wall and marginal side wall depending therefrom, said plate having a boss depending centrally therefrom and rotatably engaging said socket, said plate having a depending portion with a bore therethrough, said bore having a wall formed with keyways longitudinally thereof defined between radially inwardly projecting stops, fasteners extending through said end wall of said plate for securance to a television set or the like and having heads engaging the interior face of said end wall, a rectangular cover having an aperture traversed by said boss of said plate and engaging the interior face of said end wall within said marginal side wall, said cover engaged by said boss of said mounting means, a cylindrical turret disposed within said bore and having a threaded stud projecting from an end thereof, said turret having a slot in the other end thereof for receiving a key, said stud extending through said slot of said boss of said mounting means into threaded engagement with said boss of said plate, and tumblers carried by said turret and movable from radially extended positions of engagement with said keyways to retracted positions within said turret in response to insertion of a key into the slot of said turret.

5. A mounting assembly according to claim 4, further defined by said fasteners extending through and being movable within the limits of a plurality of slots in said end wall of said plate.

6. A mounting assembly according to claim 4, further defined by said cover being normally bowed and yieldable, said boss of said mounting means urging said cover resiliently into engagement with said end wall of said plate.

7. A mounting assembly according to claim 4, further defined by said mounting means comprising a bracket having a mounting plate adapted for unremovable attachment to a wall and a support arm projecting right angularly from said mounting plate, a pivot arm adapted for pivotal connection to the free end of said support arm, said pivot arm formed at one end with said boss having said socket therein, said support arm of said bracket having a cylindrical journal projecting laterally therefrom with an externally threaded outer end portion, said support arm having a laterally projecting helical cam surface extending substantially concentrically outwardly thereabout on the opposite side thereof from the free end of said bracket arm, said cam surface increasing in lateral extent in a direction from the lower edge towards the upper edge of said support arm, said pivot arm at the opposite end thereof from said socket having a bore extending therethrough concentrically rotatably receiving said journal and a side face formed with a helical surface complementary to said cam surface and a follower adjacent the lower end of said complementary helical surface engaging said cam surface, and a nut threadably engaging said threaded outer end portion of said journal, said threaded outer end portion being deformed to prevent removal of said nut.

8. A mounting assembly according to claim 4, further defined by said mounting means being a pedestal mount having a base plate adapted for unremovable attachment to a horizontal surface and a boss projecting upward from said base plate having said socket formed therein.

References Cited by the Examiner

UNITED STATES PATENTS

| | | | |
|---|---|---|---|
| 543,328 | 7/1895 | Bertels | 248—278 |
| 1,048,986 | 12/1912 | Mason | 248—154 |
| 1,970,660 | 8/1934 | La Fever | 109—52 |
| 3,157,379 | 11/1964 | Platokis | 248—278 |

CLAUDE A. LE ROY, *Primary Examiner.*

J. F. FOSS, *Assistant Examiner.*